(12) United States Patent
Ochi et al.

(10) Patent No.: US 6,438,479 B1
(45) Date of Patent: Aug. 20, 2002

(54) CONTROL APPARATUS FOR AN AUTOMATIC TRANSMISSION OF A VEHICLE AND METHOD

(75) Inventors: Tatsuya Ochi, Hitachi; Toshimichi Minowa, Mito; Hiroshi Ohnishi, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/495,907

(22) Filed: Feb. 2, 2000

Related U.S. Application Data

(63) Continuation of application No. 08/999,230, filed on Dec. 29, 1997, now Pat. No. 6,032,095.

(51) Int. Cl.[7] .................................................. G06F 7/00
(52) U.S. Cl. ............................. 701/51; 477/73; 477/65; 701/87
(58) Field of Search ............................. 701/51, 53, 54, 701/87; 477/73, 65, 138

(56) References Cited

U.S. PATENT DOCUMENTS

| | | | | |
|---|---|---|---|---|
| 4,633,739 A | * | 1/1987 | Ogasawara et al. | 477/148 |
| 4,709,597 A | * | 12/1987 | Yasue et al. | 475/129 |
| 4,748,809 A | * | 6/1988 | Sumiya et al. | 477/150 |
| 4,854,195 A | * | 8/1989 | Moroto et al. | 477/151 |
| 4,943,920 A | * | 7/1990 | Hiramatsu et al. | 192/3.58 |
| 5,318,159 A | * | 6/1994 | Kashiwabara | 192/3.31 |
| 5,445,579 A | * | 8/1995 | Fujita et al. | 477/132 |
| 5,588,927 A | * | 12/1996 | Tsukamoto et al. | 475/128 |
| 5,612,873 A | * | 3/1997 | Ogawa | 364/424 |
| 5,665,020 A | * | 9/1997 | Kamada et al. | 475/127 |
| 5,674,154 A | * | 10/1997 | Tsukamoto et al. | 477/131 |
| 5,725,451 A | * | 3/1998 | Tsukamoto et al. | 475/128 |
| 5,741,200 A | * | 4/1998 | Taniguchi et al. | 477/114 |
| 5,826,208 A | * | 10/1998 | Kuroiwa et al. | 701/54 |
| 5,931,884 A | * | 8/1999 | Ochiai | 701/51 |
| 5,938,712 A | * | 8/1999 | Ibamoto et al. | 701/54 |
| 6,024,670 A | * | 2/2000 | Kitagawa et al. | 477/109 |
| 6,032,095 A | * | 2/2000 | Ochi et al. | 477/138 |
| 6,146,812 A1 | * | 1/2001 | Taki et al. | 477/154 |
| 6,183,394 B1 | * | 2/2001 | Minowa et al. | 477/102 |
| 6,254,512 B1 | * | 7/2001 | Minowa et al. | 477/110 |

\* cited by examiner

*Primary Examiner*—William A. Cuchlinski, Jr.
*Assistant Examiner*—Olga Hernandez
(74) *Attorney, Agent, or Firm*—Crowell & Moring LLP

(57) ABSTRACT

An apparatus for controlling an automatic transmission of an automobile and a control method thereof. When a feedback control is executed by the automatic transmission while the speed is being changed, the control operation may often lose stability. This is due to a large deviation between a target value and a practical value at the start of the feedback control operation being caused by a change in the opening degree of the throttle and a change in the oil temperature in the automatic transmission. To solve such a technical problem, the invention employs a control apparatus which detects that the automatic transmission is changing the speed, operates the output shaft torque of the automatic transmission, recognizes a point of inflection of the output shaft torque while the speed is being changed, sets a target output shaft torque of the automatic transmission, and sets an initial target value at a moment of said point of inflection.

11 Claims, 6 Drawing Sheets

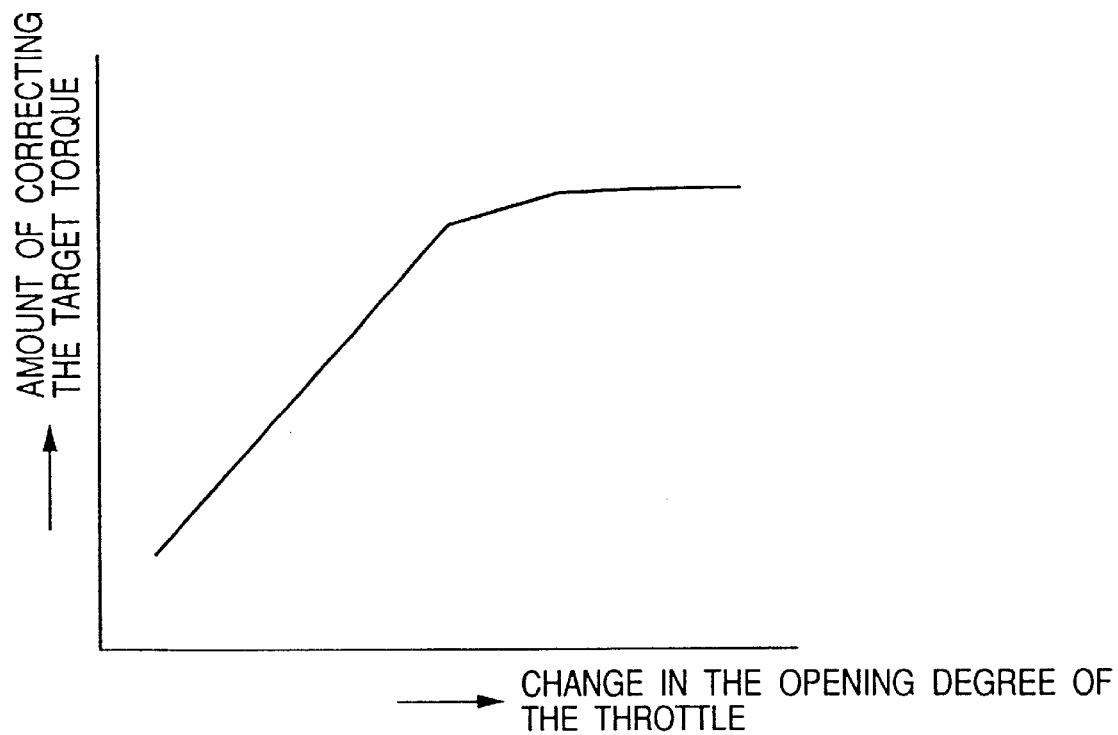

CONTROL APPARATUS FOR AN AUTOMATIC TRANSMISSION OF A VEHICLE AND METHOD

This application is a continuation of application Ser. No. 08/999,230, filed Dec. 29, 1997 now U.S Pat. No. 6,032,095.

BACKGROUND OF THE INVENTION

1. Field of the Invention

The present invention relates to a control apparatus for an automatic transmission, which controls the oil pressure for operating the clutch for changing the speed of the automatic transmission of a vehicle, and to a control method.

2. Prior Art

According to a conventional control method of this type as taught in, for example, Japanese Patent Laid-Open No. 25662/1992, the operation oil pressure to be supplied to a friction coupling device has been controlled by learning, so that a deviation decreases between a target value of change in the torque and a practical value at the start of the feedback control operation.

According to the control method taught in Japanese Patent Laid-Open No. 25662/1992, however, the deviation increases due to a change in the opening degree of the throttle and a change in the oil temperature in the automatic transmission, leaving a problem in that the control stability is impaired in the feedback control operation when the speed is being changed.

SUMMARY OF THE INVENTION

An object of the present invention is to provide an apparatus for controlling a transmission which suppresses a shock in the change of speed by bringing a target value of change in the torque into agreement with a practical value at the start of the feedback control operation, and a method thereof.

There occurs a hunting or a change in the torque when a deviation is great between a target value and a practical value at the time of starting the feedback control operation. In the conventional feedback operation for controlling the transmission, the oil pressure fed to a friction coupling device is brought into match, so that the deviation decreases between the two. However, the practical oil pressure fluctuates with respect to the instructed oil pressure due to accuracy of the actuator. Namely, the feedback control operation loses stability due to a fluctuation in the oil pressure. It has, therefore, been urged to provide an actuator having improved accuracy. According to the present invention, however, there does not occur a deviation between the two since a practical torque value is used as an initial target value. This permits the operation oil pressure to be roughly set to some extent, making it possible to use an actuator that is constructed at a lower cost.

According to the present invention, the above-mentioned problem is solved by an apparatus that is described below. That is, the present invention provides an apparatus for controlling the oil pressure of an automatic transmission, having a pressure-regulating instruction generating means which changes the speed by coupling or decoupling a predetermined friction coupling device in the automatic transmission coupled to an engine, regulates the oil pressure that acts on said friction coupling device at the time of changing the speed, and changes the pressure-regulating characteristics, and means for so controlling the output shaft torque of said automatic transmission as to follow a target value, said apparatus for controlling the oil pressure of the automatic transmission further comprising:

a speed-changing detecting means for detecting that said automatic transmission is changing the speed;

a torque operation means for operating the output shaft torque of said automatic transmission;

a point-of-inflection recognizing means for recognizing a point of inflection of the output shaft torque during the change of the speed;

a target value-setting means for setting a target value of the output shaft torque of said automatic transmission; and an initial value-setting means for setting said initial target value at a moment of said point of inflection.

BRIEF DESCRIPTION OF THE DRAWINGS

FIG. 6 is a diagram of characteristics illustrating the amount of correction of a target torque.

DETAILED DESCRIPTION OF THE PREFERRED EMBODIMENTS

An embodiment of the present invention will now be described in detail with reference to the drawings.

Figure 1:
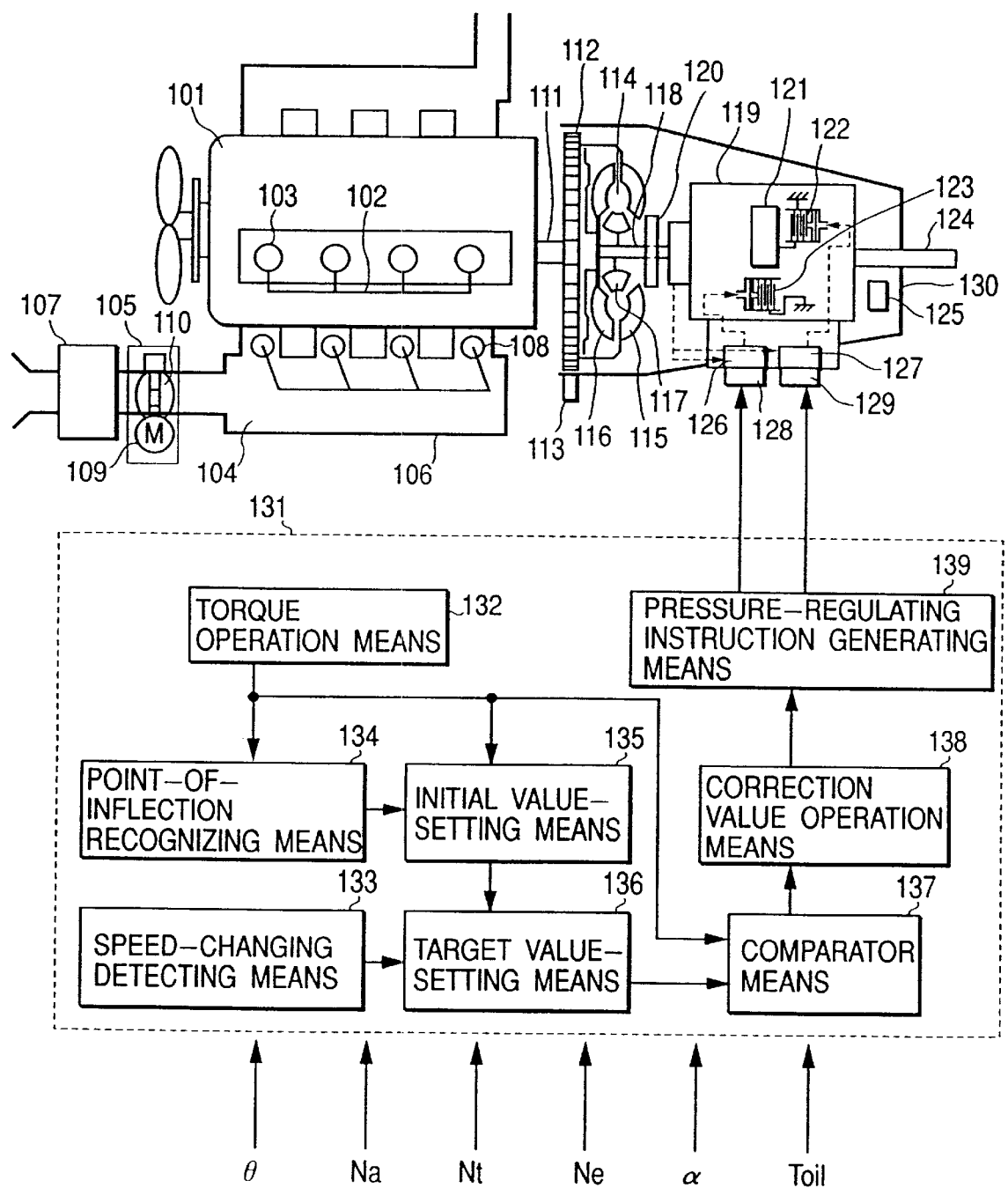
FIG. 1 is a diagram illustrating the constitution of a first embodiment of the present invention.

FIG. 1 is a diagram illustrating the constitution according to a first embodiment of the present invention. An engine 101 in this embodiment has four cylinders. The engine 101 is equipped with an ignition device 102. The ignition device 102 has four spark plugs 103 to correspond to the number of the cylinders in the engine 101. An intake pipe 104 for introducing the air into the engine 101 is provided with an electronically controlled throttle 105 for regulating the flow rate of the air that passes therethrough, a fuel injection device 106 for injecting the fuel, and an air flow meter 107. The fuel injection device 106 has four fuel injection valves 108 to correspond to the number of the cylinders in the engine 101.

The electronically controlled throttle 105 is the one in which a throttle valve 110 is driven by an actuator 109 to control the flow rate of the air. In an ordinary automobile, the throttle valve 110 and the accelerator pedal (not shown) are coupled together through a mechanical wire (not shown), so as to operate in a one-to-one manner.

A fly-wheel 112 is attached to a crank shaft 111 of the engine 101. An engine revolution sensor 113 is attached to the fly-wheel 112 to detect the number of revolutions of the crank shaft 111, i.e., to detect the running speed Ne of the engine. A torque converter 114 directly coupled to the fly-wheel 112 includes a pump 115, a turbine 116, and a stator 117. The output shaft of the turbine 116, i.e., the output shaft 118 of the torque converter, is directly coupled to a stepped transmission mechanism 119. The output shaft 118 of the torque converter is equipped with a turbine revolution sensor 120 for measuring the revolution speed Nt of the turbine.

The transmission mechanism 119 is constituted by a planetary gear 121, and friction coupling devices 122 and 123. Upon coupling or decoupling the devices 122 and 123, the gear ratio of the gear 121 is changed to change the speed. These devices 122 and 123 are controlled by spool valves 126, 127 and linear solenoids 128, 129 (pressure-regulating devices). The transmission mechanism 119 is coupled to the output shaft 124.

Furthermore, the output shaft 124 of the transmission is equipped with a vehicle speed sensor 125 for detecting the revolution speed No of the output shaft. An automatic transmission 130 is constituted by these parts.

The above-mentioned engine 101 and the actuator for driving the automatic transmission 130 are controlled by a controller 131. The controller 131 receives a throttle opening degree θ, revolution speed No of the output shaft of the transmission (may be replaced by an acceleration sensor by using differential signals), revolution speed Nt of the turbine, revolution speed No of the engine, oil temperature Toil of the transmission, depressed amount α of the accelerator pedal, etc., and uses them for effecting the control operation.

In a special system, the output shaft torque To of the transmission detected by a torque sensor (not shown) attached to the output shaft 124 of the transmission, is received by the controller 131. Furthermore, a signal of an acceleration sensor (not shown) mounted on the vehicle exhibits the same waveform as the above-mentioned torque sensor signal and can, hence, be used for controlling the friction coupling devices of the present invention.

As an example, a torque operation means 132 in the controller 131 operates the output shaft torque of the transmission. As the torque operation means, there can be exemplified an acceleration sensor signal, torque sensor signal, etc. as described above. There can be further exemplified an estimated. torque value operated from Ne, Nt and torque converter characteristics that pertain to the prior art, and an estimated torque value found from a correlation to the difference of No.

Next, the during-the-change-of-speed detecting means 133 detects whether the automatic transmission is changing the speed or not by using, for example, the ratio of revolution speeds between the input shaft and output shaft of the transmission or the so-called gear ratio. The point-of-inflection recognizing means 134 recognizes a point of inflection on the torque of the output shaft during the change of the speed. As this means, use can be made of a method which uses a change in the torque found by the torque operation means or a method of detecting a timing at which the gear ratio assumes a desired value. Here, when a point of inflection is recognized during the change of the speed, the initial value-setting means 135 sets the value found by the torque operation means 132 as an initial value. A target value-setting means 136 sets an ideal waveform of a change in the torque during the change of the speed as a target value.

Next, a comparator means 137 operates a deviation between the target value that is set as described above and a practical torque found by the torque operation means 132. By using a deviation operated by the comparator means, a correction value operation means 138 finds an amount of correction for feedback control. Based upon the amount of correction found by the correction value operation means 138, a pressure-regulating instruction generating means 139 outputs a pressure-regulating instruction to the actuator, so that a change in the torque during the change of the speed will follow the target value.

Figure 2:
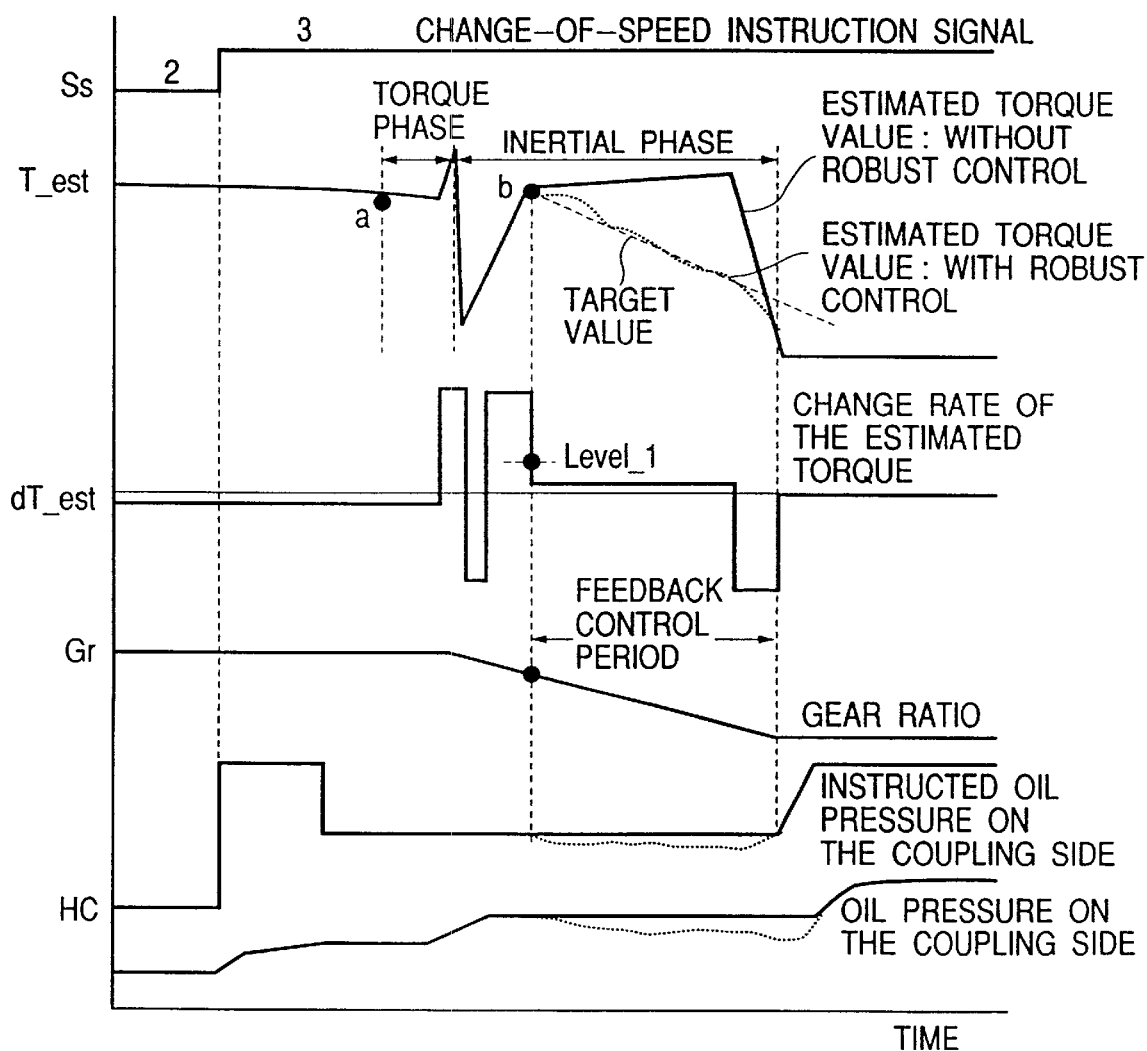
FIG. 2 is a time chart at the time of shift-up.

FIG. 2 is a time chart of signals at the time of shift up and of physical quantities. The following description deals with the case of changing the second gear to the third gear. When a change-of-speed instruction signal changes from a second gear to a third gear, an oil pressure instruction value (HC) of the coupling side is raised to a maximum instruction value. This is to fill the clutch chamber with an oil to improve control performance, and to shorten the time from the generation of the change-of-speed instruction signal to the start of change of the speed.

After the oil has been charged, the oil pressure instruction HC is set to a value at which the accelerations are in agreement at points a and b in the drawing. This instruction value is set based upon a physical formula consisting of an input torque of the clutch and the revolution speed. The torque phase starts with an increase in the oil pressure on the coupling side as instructed. As the torque phase starts and the clutch of the decoupling side is decoupled, the inertial phase is introduced.

In the inertial phase, the inertial energy increases, and an estimated torque assumes a waveform as shown. Here, a target acceleration is set to suppress the shock in the change of the speed, and the oil pressure of the coupling side is controlled by feedback, so that a practical estimated torque approaches the target value.

Here, an estimated change of torque (dT_est) has been operated and when it is recognized that the value dT_est is lower than the Level_1 during the change of the speed, the target value of the above-mentioned feedback control operation is set. A value detected by a change-of-torque detecting means is used as the initial target value. Therefore, the target value at the start of the feedback control operation is necessarily in agreement with the practical value, and there exists no deviation between the two, contributing to enhancing the performance for following the target value in the feedback control operation.

Figure 3:
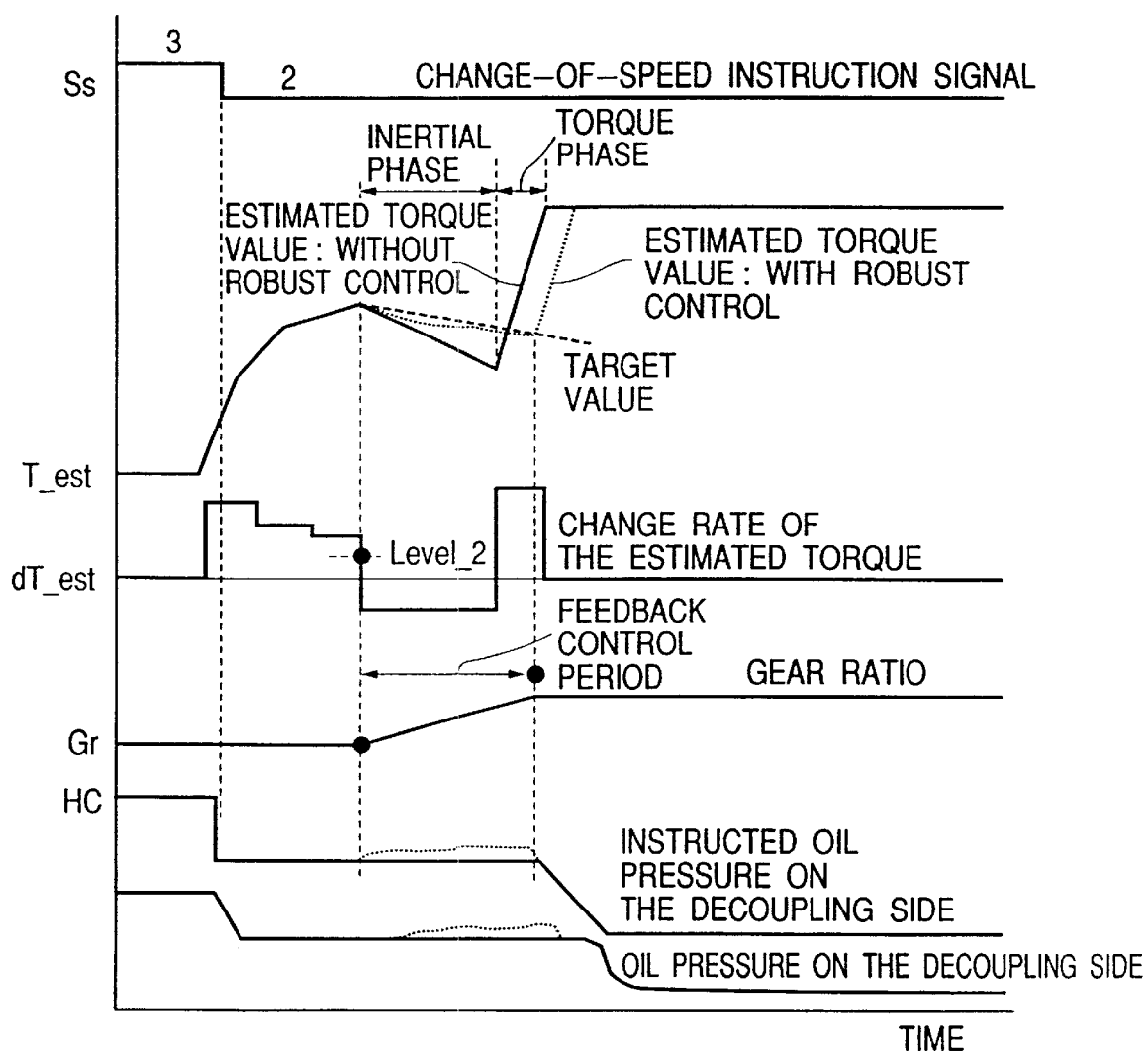
FIG. 3 is a time chart at the time of shift-down.

FIG. 3 is a time chart of signals at the time of shift down and of physical quantities. The following description deals with the case of changing the third gear to the second gear. When the change-of-speed instruction signal changes from the third gear to the second gear, the oil pressure instruction (HC) of the coupling side is set to a value based upon a physical formula determined by an input torque of the clutch and the revolution speed. Accompanying a shifted-down clutch of the decoupling side, the clutch of the decoupling side starts being decoupled and the inertial phase starts. Here, when there is no feedback control, the torque decreases with an increase in the revolution speed as shown in FIG. 3. The oil pressure of the decoupling side is controlled by feedback so that the estimated torque approaches the target value.

Like the case of the shift up, the target value is set by using an estimated change rate of torque (dT_est) when dT_est is lower than the Level 2 during the change of the speed. Therefore, there occurs no deviation between an actual value of an estimated torque and the target value at the start of the feedback control operation, contributing to enhancing the target-following performance.

Figure 4:
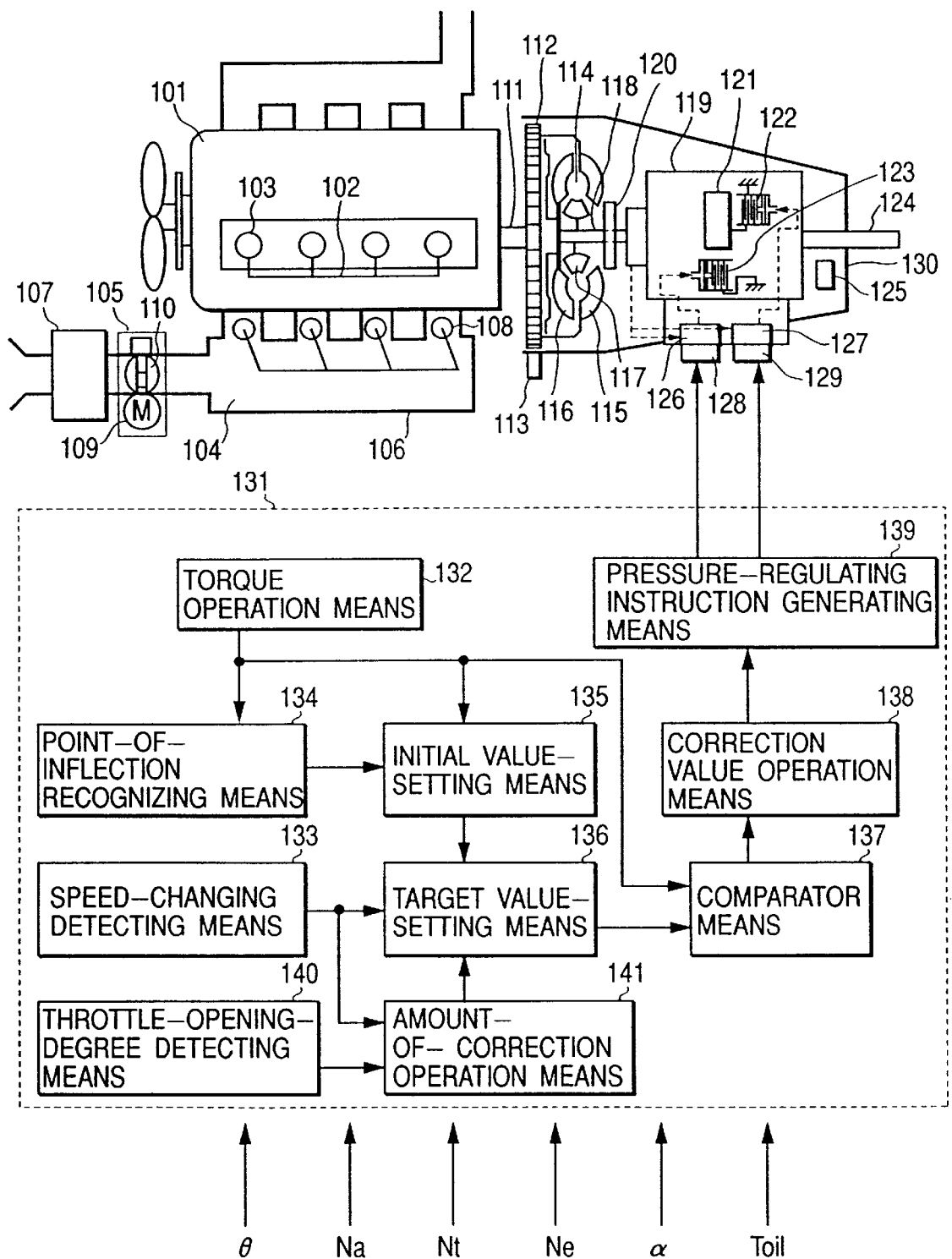
FIG. 4 is a diagram illustrating the constitution of a second embodiment of the present invention.
Figure 5:
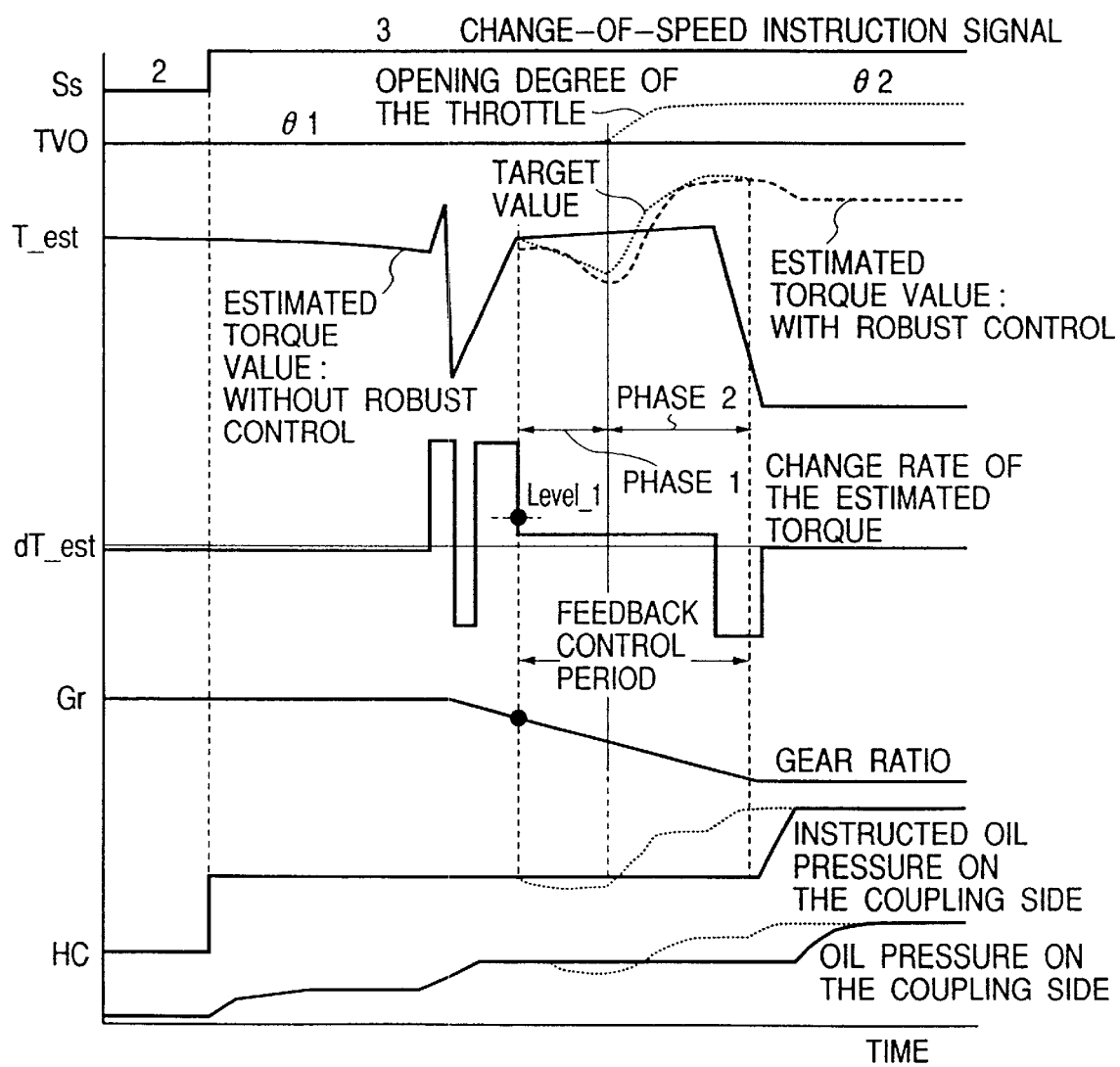
FIG. 5 is a time chart at the time of shift-up.

FIG. 4 is a diagram illustrating the constitution according to a second embodiment of the present invention, FIG. 5 is a time chart when the accelerator pedal is depressed during the shift-up, and FIG. 6 is a diagram of characteristics illustrating the amount of correcting the target torque.

Referring to FIG. 4, the same mechanisms as those of FIG. 1 are not described here again. A throttle-opening-degree detecting means 140 detects the opening degree of the throttle valve. When the detected opening degree of the throttle valve has changed while the automatic transmission is changing the speed, an amount-of-correction operation means 141 corrects the target value that is set by the target value-setting means 136. The amount of correction is determined depending upon a change in the opening degree of the throttle valve during the change of the speed as shown in FIG. 6.

Referring to FIG. 5, described below is the case of changing the second gear to the third gear. In the feedback control operation as described above, the practically estimated torque value is set as an initial target value. In the phase 1 during the change of the speed, the feedback control operation is carried out so that an ordinary target value is set and the practically estimated torque follows the target value.

Here, in the phase 2 where the accelerator pedal is depressed and the opening degree of the throttle valve changes from θ1 to θ2, the input torque of the clutch increases and, hence, the clutch is not coupled and the speed does not change. That is, when the pedal valve is depressed during the change of the speed, the oil pressure of the coupling side must be elevated so that the clutch is coupled. Depending upon a change in the opening degree of the throttle valve, therefore, the target value is corrected and the feedback control operation is executed to obtain favorable speed-change characteristics even under the above-mentioned operation conditions.

As described above, the present invention solves the problem in that a deviation increases between a target value and a practical value at the start of the feedback control operation due to a change in the opening degree of the throttle valve and a change in the oil temperature in the automatic transmission impairing the stability in the feedback control operation during the change of the speed. Namely, the invention brings a target value in the change of the torque into agreement with a practical value at the start of the feedback control operation, making it possible to suppress a shock during the change of the speed, which is an excellent effect.

What is claimed is:

1. A method of controlling an automatic transmission, comprising performing a shift operation by feed-back controlling oil pressure which acts on a plurality of friction coupling components based on an estimated torque value of an output shaft of the automatic transmission; coupling or decoupling said friction coupling components, and setting a target value with said estimated torque value being applied as an initial value at least during the shift operation.

2. A method of controlling transmission, comprising performing a shift operation by feed-back controlling oil pressure which acts on a plurality of friction coupling components based on an estimated torque value of an output shaft of the automatic transmission; coupling or decoupling said friction coupling components, and setting a target value with said estimated torque value being applied as an initial value when a ratio between the input and output rotating speeds of the transmission reaches a desired value.

3. The method according to claim 1,
   wherein said estimated torque value is one of a calculated and an obtained estimated torque value.

4. The method according to claim 2,
   wherein said estimated torque value is one of a calculated and an estimated torque value.

5. A method of controlling an automatic transmission, comprising performing a shift operation by feedback controlling oil pressure which acts on a plurality of friction coupling components based on one of a calculated value and an estimated value of torque of an output shaft of the automatic transmission; coupling or decoupling said friction coupling components, wherein an output shaft torque during shifting of said automatic transmission is one of calculated and estimated; and setting a target value with said calculated or said estimated output shaft torque value being applied as an initial value.

6. A method of controlling an automatic transmission, comprising performing a shift operation by feedback controlling oil pressure which acts on a plurality of friction coupling components on the basis of a detected torque value of an output shaft of the automatic transmission; coupling or decoupling said friction coupling components; and setting a target value with said detected torque value being applied as an initial value at least during the shift operation.

7. A method of controlling an automatic transmission, comprising performing a shift operation by feedback controlling oil pressure which acts on a plurality of friction coupling components based on a detected torque value of an output shaft of the automatic transmission; coupling or decoupling said friction coupling components; and setting wherein a target value with said detected torque value being applied as an initial value where a ratio between input and output rotating speeds of the automatic transmission reaches a desired value.

8. A method of controlling an automatic transmission, comprising performing a shift operation by feedback controlling oil pressure which acts on a plurality of friction coupling components based on a detected value of an output shaft torque and coupling or decoupling said friction coupling components of the transmission; detecting an output shaft torque during the shifting operation of said automatic transmission; and setting a target value with said detected output shaft torque value being applied as an initial value.

9. A method of controlling an automatic transmission, comprising performing a shift operation by feedback controlling oil pressure which acts on a plurality of friction coupling components; coupling or decoupling said friction coupling components; detecting a rotating speed of an input shaft of said automatic transmission during the shift operation; and feed-backing controlling the oil pressure which acts on said friction coupling components so that the rotating speed of said input shaft-during the shift operation is followed to a target value with said detected input shaft torque value being applied as an initial value.

10. A method of controlling an automatic transmission, comprising performing a shift operation by feedback controlling oil pressure which acts on a plurality of friction coupling components on the basis of a detected value of a rotating speed of an input shaft of the automatic transmission; coupling or decoupling said friction coupling components; and setting at least during the shift operation a target value with the detected value of said rotating speed of the input shaft being applied as an initial value.

11. A method of controlling an automatic transmission, comprising performing a shift operation by feedback controlling oil pressure which acts on a plurality of friction coupling components; coupling or decoupling said friction coupling components; estimating or calculating a value of an output shaft torque of said automatic transmission during shift operation; and feed-back controlling the oil pressure which acts on said friction coupling components so that the value of said output shaft torque during the shift operation is followed to a target value with the estimated value of said output shaft torque being applied as an initial value.

\* \* \* \* \*